United States Patent
Wu et al.

(10) Patent No.: US 7,359,025 B2
(45) Date of Patent: Apr. 15, 2008

(54) ARRAY SUBSTRATE FOR LIQUID CRYSTAL DISPLAY WITH PARTICULAR STORAGE CAPACITOR ELECTRODES

(75) Inventors: Ming-Chou Wu, Nantou (TW); Jenn-Jia Su, Budai Township, Chiayi County (TW); Cheng-Han Tsao, Banciao (TW); Po-Lun Chen, Chiayi (TW)

(73) Assignee: AU Optronics Corp., Hsinchu (TW)

( * ) Notice: Subject to any disclaimer, the term of this patent is extended or adjusted under 35 U.S.C. 154(b) by 516 days.

(21) Appl. No.: 11/176,608

(22) Filed: Jul. 7, 2005

(65) Prior Publication Data
US 2006/0215097 A1    Sep. 28, 2006

(30) Foreign Application Priority Data
Mar. 22, 2005  (TW)  .............................. 94108737 A

(51) Int. Cl.
*G02F 1/1343*  (2006.01)
*G02F 1/1337*  (2006.01)

(52) U.S. Cl. .................. 349/139; 349/146; 349/129; 349/38

(58) Field of Classification Search ............ 349/139, 349/146, 38–39, 158, 129
See application file for complete search history.

(56) References Cited

U.S. PATENT DOCUMENTS

| | | | | |
|---|---|---|---|---|
| 6,424,397 B1 * | 7/2002 | Kuo | ............................ | 349/139 |
| 6,671,020 B2 * | 12/2003 | Kim et al. | .................. | 349/129 |
| 6,839,104 B2 * | 1/2005 | Taniguchi et al. | .......... | 349/106 |
| 6,897,929 B2 * | 5/2005 | Takeda et al. | ............. | 349/129 |
| 7,199,856 B2 * | 4/2007 | Inoue et al. | ................ | 349/191 |
| 7,289,178 B2 * | 10/2007 | Sasabayashi et al. | ....... | 349/127 |
| 2001/0019391 A1 * | 9/2001 | Kim et al. | .................. | 349/139 |

* cited by examiner

*Primary Examiner*—Mike Qi
(74) *Attorney, Agent, or Firm*—Thomas, Kayden, Horstemeyer & Risley

(57) ABSTRACT

An array substrate capable for a liquid crystal display (LCD). A pixel electrode is disposed in a pixel region of a substrate, which comprises at least one slit. A storage capacitor is disposed between the substrate and the pixel electrode, which comprises a bottom electrode, a capacitor dielectric layer, and a top electrode. The bottom electrode is disposed in the pixel region, creating an overlap region with the slit. The capacitor dielectric layer and the top electrode are successively disposed on the bottom electrode, in which the top electrode comprises at least one recess region to partially expose the overlap region.

14 Claims, 6 Drawing Sheets

ARRAY SUBSTRATE FOR LIQUID CRYSTAL DISPLAY WITH PARTICULAR STORAGE CAPACITOR ELECTRODES

BACKGROUND

The invention relates to an array substrate and in particular to an array substrate for a wide-viewing angle liquid crystal display (LCD).

LCDs employ applied voltage to change the alignment of liquid crystal molecules, and resulting optical characteristics, such as double refraction, optical rotation, and dichromatism cause display variations. Due to thin profile, light weight, low power consumption, and low operating voltage, LCDs are widely employed in electronic products, such as portable personal computers, digital cameras, projectors, and the like.

Currently, LCD development is directed towards increased brightness, contrast, viewing angle, and large display area with full color display. To improve the viewing angle, a multi-domain vertical alignment liquid crystal display (MVALCD) has been developed, in which the display area of the LCD is divided into multiple domains, such that liquid crystal molecules incline at different angles to increase the viewing angle. In such an LCD, a pre-tilt angle controls the alignment of the liquid crystal, providing precise control of the inclination of the liquid crystal molecules. Commonly, slits and protrusions are employed to provide the pre-tilt angle.

FIG. 6 illustrates an array substrate 100 of a conventional MVALCD. The array substrate 100 comprises a glass substrate 101, a storage capacitor 102, an insulating layer 104, and a pixel electrode 106. The storage capacitor 102, the insulating layer 104, and the pixel electrode 106 are successively disposed on the glass substrate 100. The storage capacitor 102 includes a bottom electrode 102a, a capacitor dielectric layer 102b, and an upper electrode 102c, in which the upper electrode 102c is electrically connected to an overlying pixel electrode 106 through a contact hole 104a. The pixel electrode 106 has a slit 106a across the storage capacitor 102, to provide a pre-tilt angle.

The upper electrode 102c and the pixel electrode 106, however, have the same potential when voltage is applied to the pixel electrode 106 due to electrical connection, such that the slit 106a over the storage capacitor 102 (overlap region between the slit 106a and the storage capacitor 102) cannot provide a pre-tilt angle. Thus, disclination lines may be generated on the liquid crystal layer (not shown) near the slit 106a over the storage capacitor 102. The generated disclination lines can reduce the brightness and increase the response time of the LCD. In particular, color washout may become more serious due to the disclination lines, reducing image quality.

SUMMARY

Array substrates for liquid crystal display are provided. An embodiment of an array substrate for a liquid crystal display comprises a substrate having a pixel region. A pixel electrode is disposed in the pixel region, comprising at least one slit. A storage capacitor is disposed between the substrate and the pixel electrode, comprising a bottom electrode disposed in the pixel region, creating an overlap region with the slit. A capacitor dielectric layer is disposed on the bottom electrode. A top electrode is disposed on the capacitor dielectric layer on the bottom electrode, comprising at least one recess region to partially expose the overlap region.

Another embodiment of an array substrate for a liquid crystal display comprises a substrate having a pixel region. A pixel electrode is disposed in the pixel region, comprising at least one slit. A storage capacitor is disposed between the substrate and the pixel electrode, comprising a bottom electrode disposed in the pixel region, creating an overlap region with the slit. A capacitor dielectric layer is disposed on the bottom electrode. At least two top electrodes are disposed on the capacitor dielectric layer on the bottom electrode and separated by the overlap region.

DESCRIPTION OF THE DRAWINGS

The invention will become more fully understood from the detailed description given hereinbelow and the accompanying drawings, given by way of illustration only and thus not intended to be limitative of the invention.

DETAILED DESCRIPTION

Figure 1:
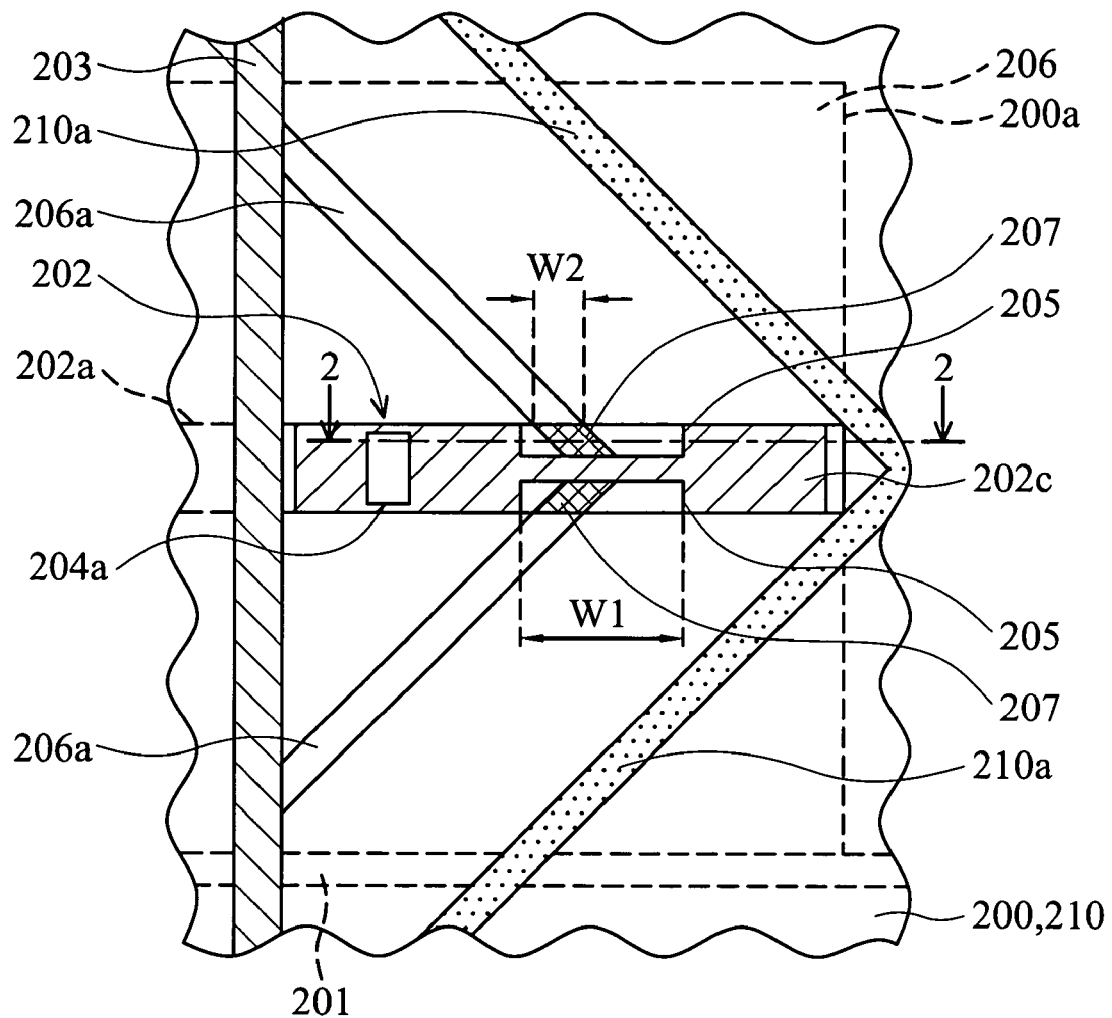
FIG. 1 is a plane view of an embodiment of a wide-viewing angle liquid crystal display of the invention.
Figure 2A:
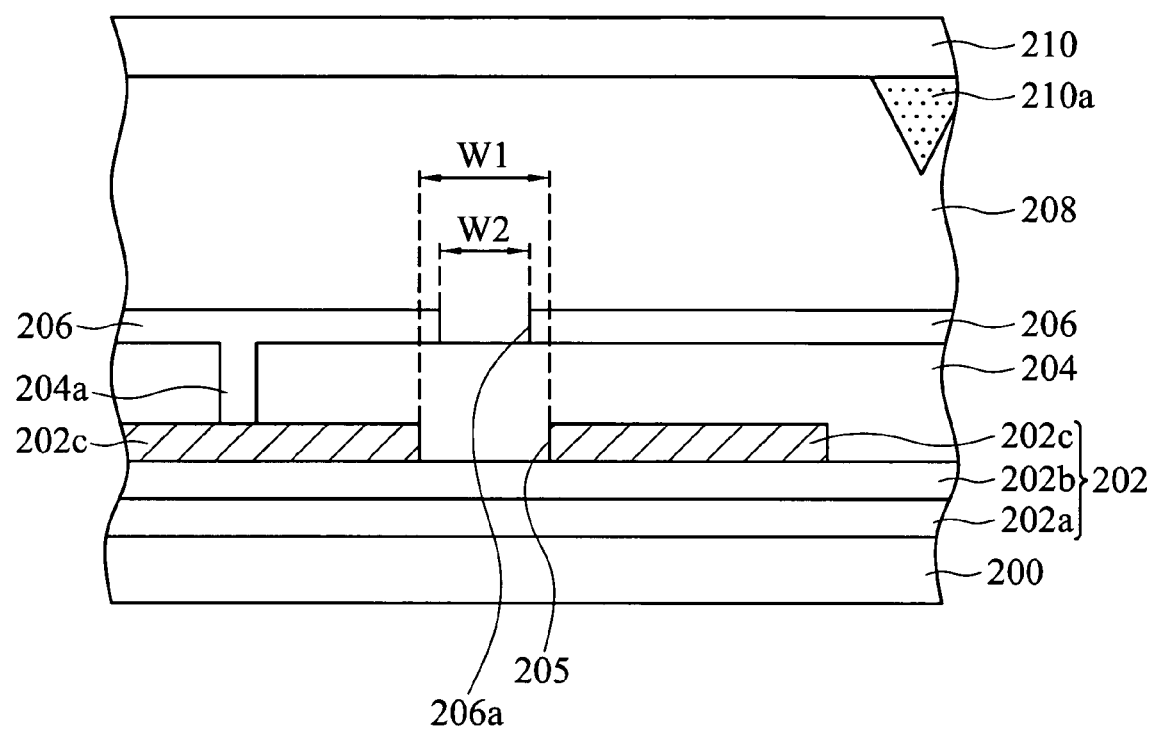
FIG. 2a is a cross-section along 2-2 line in FIG. 1.

An array substrate for a liquid crystal display will be described in greater detail in the following. FIG. 1 illustrates a plane view of an embodiment of a wide-viewing angle liquid crystal display and FIG. 2a is a cross-section along 2-2 line in FIG. 1. In this embodiment, the wide-viewing angle liquid crystal display may be a multi-domain vertical alignment liquid crystal display (MVALCD). The LCD comprises a lower substrate 200, a storage capacitor 202, an insulating layer (a passivation layer) 204, a pixel electrode 206, a liquid crystal layer 208, and an upper substrate 210. The lower substrate 200 may comprise transparent glass or quartz, having a plurality of date lines and gate lines thereon and serving as an array substrate. Typically, data lines vertically intersect gate lines to form a plurality of pixel regions. Here, only a gate line 201, a data line 203, and a pixel region 200a created by the gate line 201 and the data line 203 are shown for diagram simplification.

The pixel electrode 206 and a thin film transistor (not shown) electrically connected to the gate line 201 and the data line 203 are disposed in the pixel region 200a on the lower substrate 200. The pixel electrode 206 may comprise transparent conductive material, such as indium tin oxide (ITO). Moreover, the pixel electrode 206 comprises at least one slit 206a. In this embodiment, the slit 206a acts as a virtual protrusion for the MVALCD. The insulating layer 204, such as an organic material or silicon nitride layer, is disposed in the pixel region 200a between the pixel electrode 206 and the lower substrate 200, as shown in FIG. 2a.

Figure 2B:
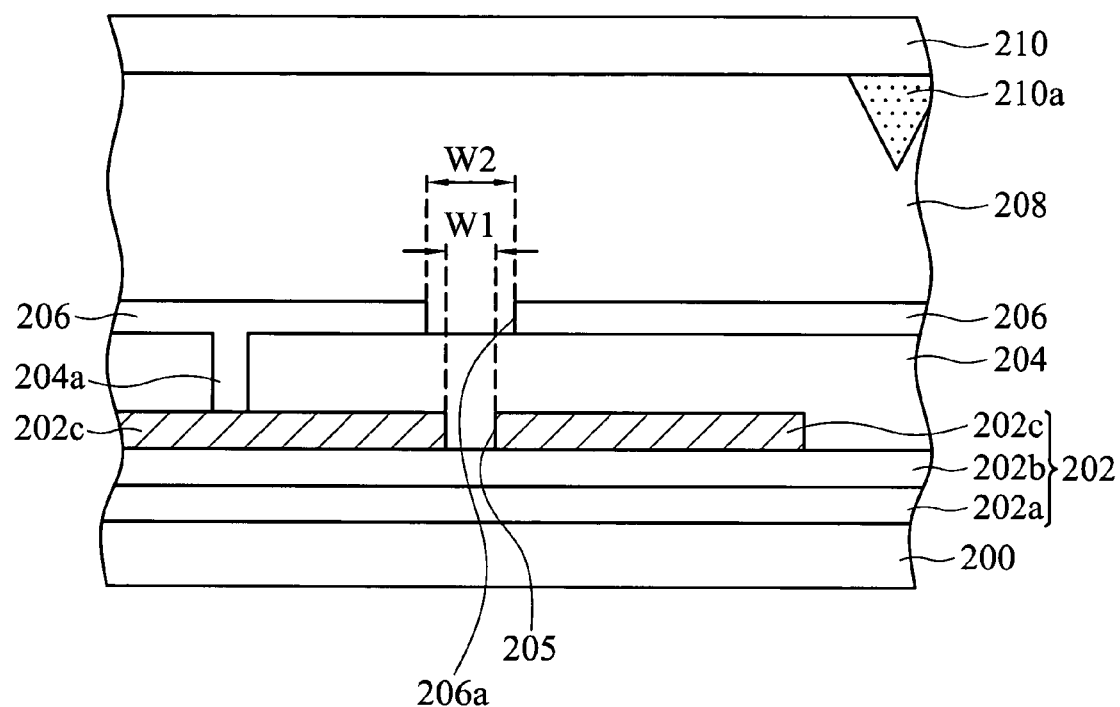
FIG. 2b is a cross-section of an embodiment of a wide-viewing angle liquid crystal display of the invention.

The storage capacitor 202 is disposed between the lower substrate 200 and the insulating layer 204 underlying the pixel electrode 206 (as shown in FIG. 2a) and positioned in the middle of the pixel region 200a (as shown in FIG. 1) The storage capacitor 202 may comprise a bottom electrode 202a, a capacitor dielectric layer 202b, and a top electrode 200c, in which the top electrode 202c is electrically connected to the pixel electrode 206 through a contact hole 204a formed in the insulating layer 204. In this embodiment, the bottom electrode 202a may be line-shaped, having a tilt angle with respect to the slit 206a in the pixel electrode 206. For example, the slit 206a may be V-shaped and symmetrical with respect to the bottom electrode 202a. Moreover, there is an overlap region 207 between the bottom electrode 202a and the slit 206a. The capacitor dielectric layer 202b is disposed on the bottom electrode 202a, and the top electrode 202c disposed on the capacitor dielectric layer 202b overlying the bottom electrode 202a. In this embodiment, the top electrode 202c comprises at least one recess region 205 to partially expose the overlap region 207. For example, the top electrode 202c comprises a pair of recess regions 205 with a width W1 no narrower than a with W2 of the slit 206a, as shown in FIG. 2a. In another embodiment, the recess region 205 may be narrower than the slit 206a, as shown in FIG. 2b. Note that the width W1 of the recess region 205 must be wider than or equal to 3 μm.

The upper substrate 210, such as transparent glass or quartz is disposed over the lower substrate 200. The upper substrate 210 comprises at least one protrusion 210a opposite and parallel to the slit 206a. The liquid crystal layer 208 is disposed between the lower and upper substrates 200 and 210.

In this embodiment, the area of the top electrode 202c above the overlap region 207 between the bottom electrode 202a and the slit 206a can be substantially reduced. Thus, the slits 206a in the overlap region 207 may maintain function without failure because the pixel electrode 206 has a potential different from the top electrode 202c of the storage capacitor 202 when voltage is applied to the pixel electrode 206. Thus, the disclination line can be eliminated. Accordingly, the array substrate of the invention can improve brightness and response time of displays. Moreover, color washout near the storage capacitor 202 can also be improved, benefitting the image quality.

Figure 3:
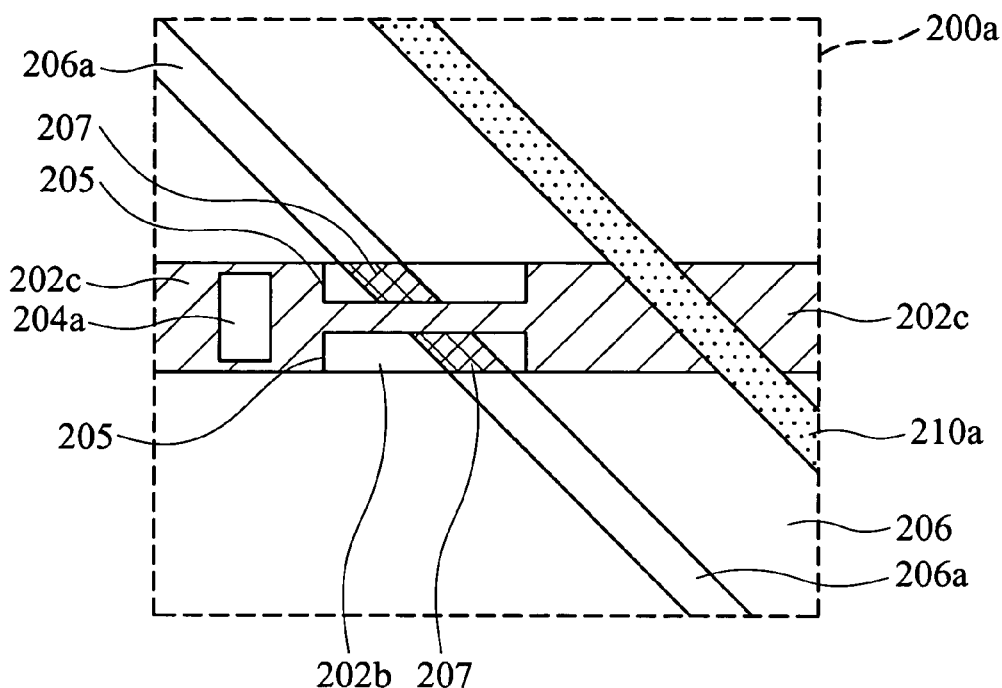
FIG. 3 is a plane view of an embodiment of a wide-viewing angle liquid crystal display of the invention.

FIG. 3 is a plane view of another embodiment of a wide-viewing angle liquid crystal display, in which the same reference numbers as FIG. 1 are used, with like descriptions omitted. Unlike the embodiment in FIG. 1, the slit 206a in the pixel electrode 206 is line-shaped and has a tilt angle with respect to the bottom electrode 202a.

Figure 4:
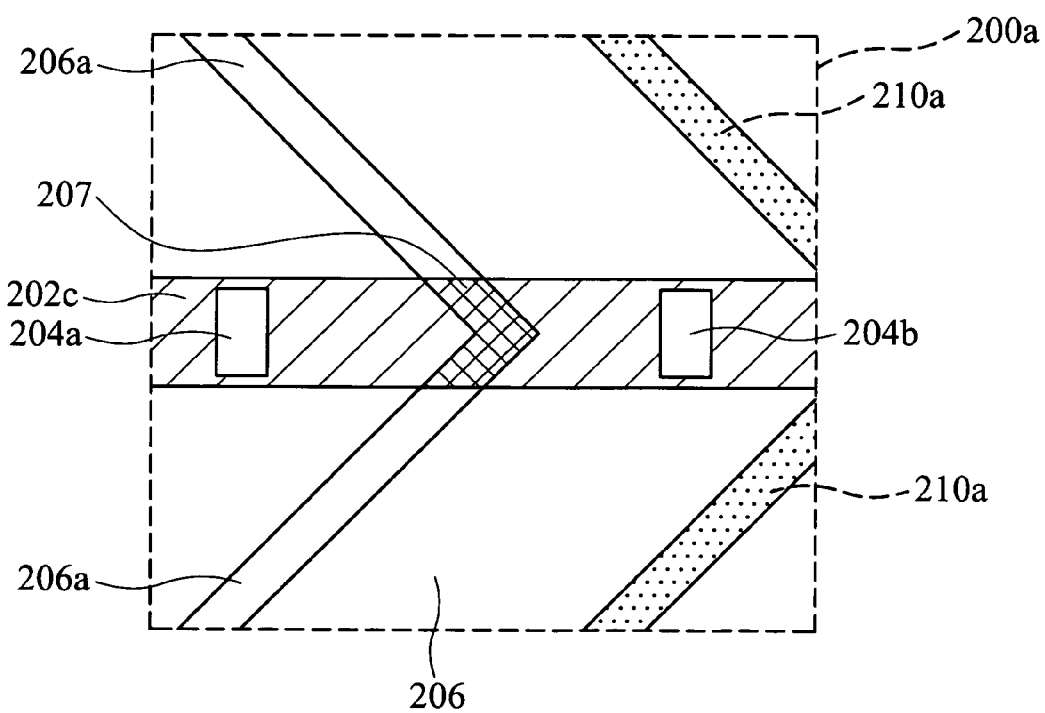
FIG. 4 is a plane view of an embodiment of a wide-viewing angle liquid crystal display of the invention.

FIG. 4 is a plane view of yet another embodiment of a wide-viewing angle liquid crystal display, in which the same reference numbers as FIG. 1 are used, with like descriptions omitted. Unlike the embodiment in FIG. 1, the top electrode 202c is divided into two portions and separated by the overlap region 207. That is, the separated top electrode 202c has a gap above the overlap region 207, such that the overlap region 207 is completely or partially exposed. Here, only a completely exposed overlap region 207 is shown. As a result, the slits 206a in the overlap region 207 maintain function without failure because the pixel electrode 206 has a different potential from the top electrodes 202c of the storage capacitor 202 when voltage is applied to the pixel electrode 206. Note that an additional contact hole 204b must be formed in the insulating layer 204 since the top electrode 202c comprises at least two-separate portions, such that each separate portion of the top electrode 202c can electrically connect to the pixel electrode 206, respectively. For example, the separate portions of the top electrode 202c may correspond to the contact holes 204a and 204b, respectively.

Figure 5:
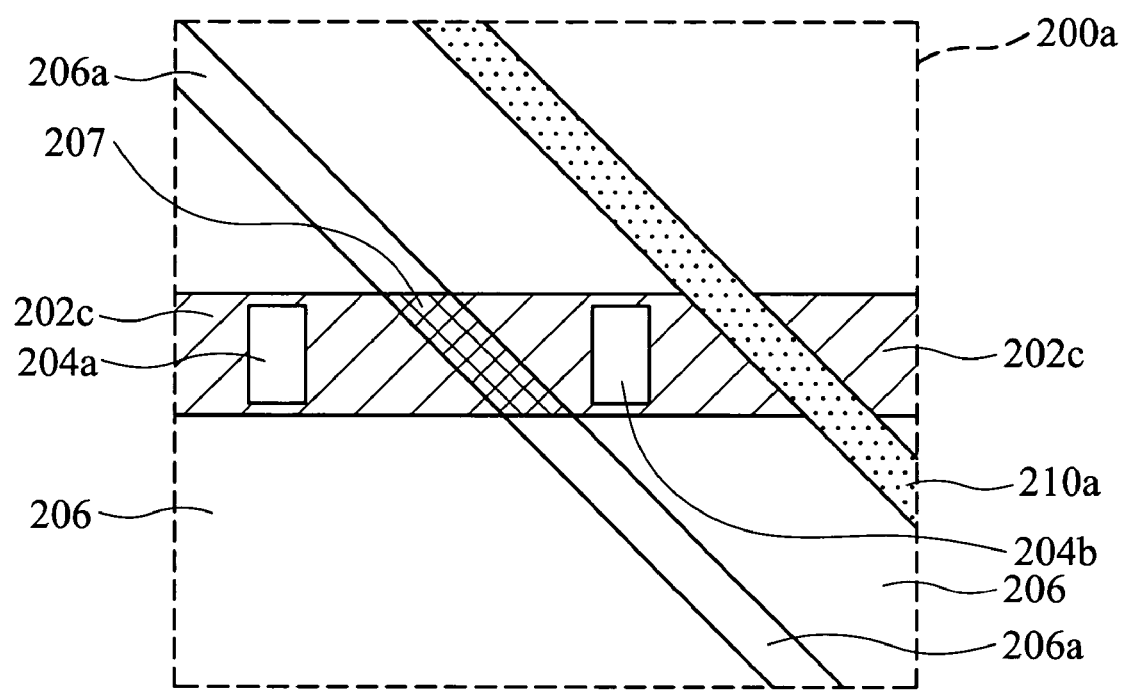
FIG. 5 is a plane view of an embodiment of a wide-viewing angle liquid crystal display of the invention.
Figure 6:
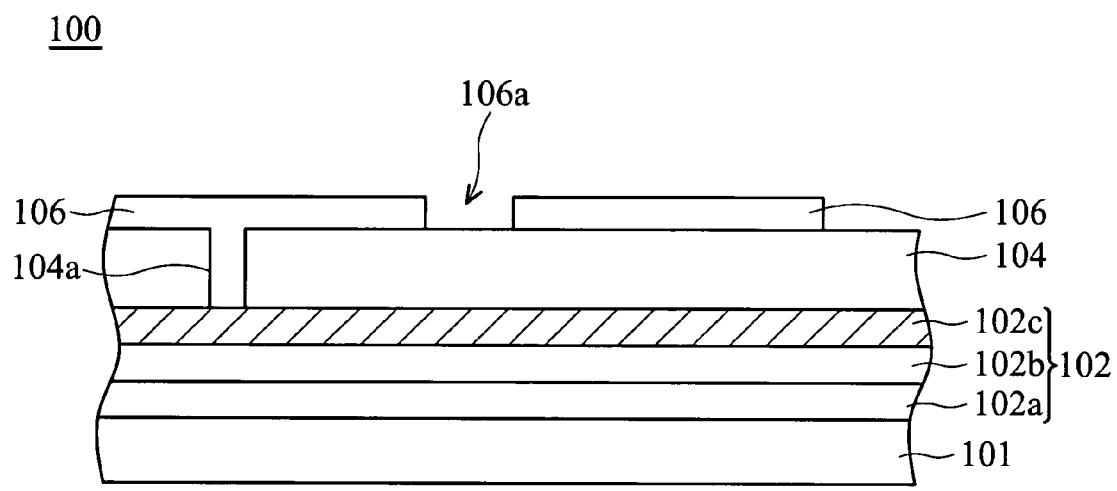
FIG. 6 is a cross-section of an array substrate for a conventional multi-domain vertical alignment liquid crystal display.

FIG. 5 is a plane view of further another embodiment of a wide-viewing angle liquid crystal display, in which the same reference numbers as FIG. 4 are used, with like descriptions omitted. Unlike the embodiment in FIG. 4, the slit 206a in the pixel electrode 206 is line-shaped and has a tilt angle with respect to the bottom electrode 202a. Also, the top electrode 202c is divided into two portions and separated by the overlap region 207, such that the line-shaped overlap region 207 is completely or partially exposed. Here, only a completely exposed overlap region 207 is shown. An additional contact hole 204b is also formed in the insulating layer 204, such that each separate portion of the top electrode 202c can electrically connect to the pixel electrode 206, respectively.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An array substrate for a liquid crystal display, comprising:
    a substrate having a pixel region;
    a pixel electrode, disposed in the pixel region, comprising at least one slit; and
    a storage capacitor disposed between the substrate and the pixel electrode, comprising:
        a bottom electrode disposed in the pixel region, creating an overlap region with the slit;
        a capacitor dielectric layer disposed on the bottom electrode; and
        a top electrode, disposed on the capacitor dielectric layer on the bottom electrode, comprising at least one recess region to partially expose the overlap region.

2. The array substrate as claimed in claim 1, wherein the width of slit is wider than or equal to the width of the recess region.

3. The array substrate as claimed in claim 1, wherein the width of slit is narrower than the width of the recess region.

4. The array substrate as claimed in claim 1, wherein the width of recess region is wider than or equal to 3 μm.

5. The array substrate as claimed in claim 1, wherein the bottom electrode is line-shaped, having a tilt angle with respect to the slit.

6. The array substrate as claimed in claim 5, wherein the slit is V-shaped and symmetrical with respect to the bottom electrode.

7. The array substrate as claimed in claim 5, wherein the top electrode comprises a pair of recess regions to partially expose the overlap region, respectively.

8. The array substrate as claimed in claim 5, further comprising an insulating layer, disposed between the pixel electrode and the storage capacitor, having a contact hole to form an electrical connection between the pixel electrode and the top electrode.

9. The array substrate as claimed in claim 5, wherein the bottom electrode is disposed in the middle of the pixel region.

10. An array substrate for a liquid crystal display, comprising:
    a substrate having a pixel region;
    a pixel electrode, disposed in the pixel region, having at least one slit; and a storage capacitor disposed between the substrate and the pixel electrode, comprising:
- a bottom electrode disposed in the pixel region, creating an overlap region with the slit;
- a capacitor dielectric layer disposed on the bottom electrode; and
- at least two top electrodes disposed on the capacitor dielectric layer on the bottom electrode and separated from each other by the overlap region.

11. The array substrate as claimed in claim 10, wherein the bottom electrode is line-shaped, having a tilt angle with respect to the slit.

12. The array substrate as claimed in claim 11, wherein the slit is V-shaped and symmetrical with respect to the bottom electrode.

13. The array substrate as claimed in claim 10, further comprising an insulating layer, disposed between the pixel electrode and the storage capacitor, comprising at least two contact holes to form electrical connections between the pixel electrode and each top electrode.

14. The array substrate as claimed in claim 10, wherein the bottom electrode is disposed in the middle of the pixel region.

* * * * *